Figure 1:
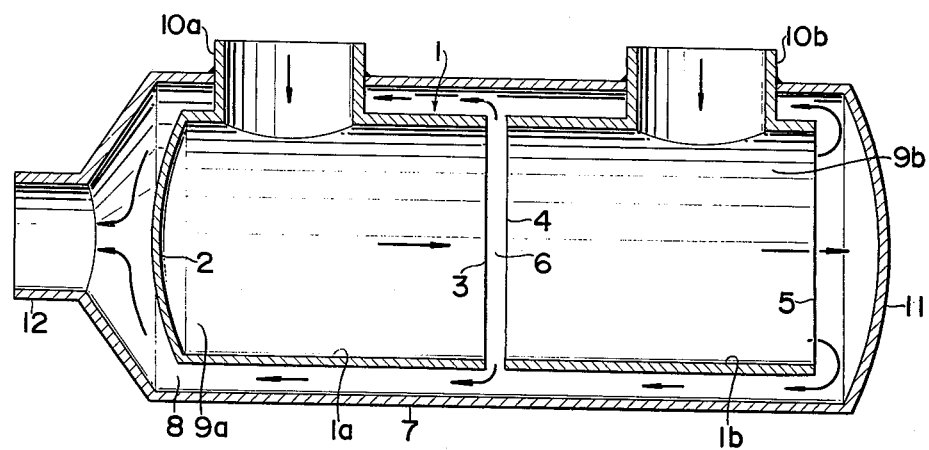

United States Patent [19]
Kawata

[11] 3,921,395
[45] Nov. 25, 1975

[54] ENGINE EXHAUST GAS PURIFYING MEANS

[75] Inventor: Masayuki Kawata, Hiroshima, Japan

[73] Assignee: Toyo Kogyo Co., Ltd., Japan

[22] Filed: Oct. 23, 1974

[21] Appl. No.: 517,315

[30] Foreign Application Priority Data
Oct. 24, 1973  Japan............................ 48-123263

[52] U.S. Cl. ...................... 60/282; 60/323; 181/40
[51] Int. Cl.² ............................................. F01N 3/10
[58] Field of Search ......... 60/282, 302, 323; 181/40

[56] References Cited
UNITED STATES PATENTS

| | | |
|---|---|---|
| 3,302,394 | 2/1967 | Pahnke ................................. 60/323 |
| 3,633,368 | 1/1972 | Rosenlund ........................... 60/323 |
| 3,785,153 | 1/1974 | Schwing................................ 60/282 |

*Primary Examiner*—Douglas Hart
*Attorney, Agent, or Firm*—Fleit & Jacobson

[57] ABSTRACT

Engine exhaust gas purifying means including an outer shell and inner shell means which comprises a pair of axially aligned cylindrical inner shell elements, the first of the elements having a closed end and an open end and the second having opposite open ends, an inlet pipe being provided on each inner shell element and extending radially through and secured to said outer shell, said outer shell being provided with an outlet at an end adjacent to the first inner shell element.

5 Claims, 2 Drawing Figures

U.S. Patent  Nov. 25, 1975  3,921,395

ENGINE EXHAUST GAS PURIFYING MEANS

The present invention relates to engine exhaust gas purifying means and more particularly to means for oxydizing unburnt constituents of fuel contained in engine exhaust gas.

In order to make noxious unburnt constituents of fuel such as carbon monoxide and hydrocarbon contained in engine exhaust gas oxidized before they are discharged into atmosphere, it has commonly been known to employ means for burning such unburnt constituents with addition of secondary air. Such burning means is typically known as a thermal reactor. Since it is desirable to maintain a substantial temperature in such a reactor in order to obtain satisfactory oxydation, it has already been proposed to provide a thermal reactor of a multiple wall construction which has an outer casing enclosing an inner shell with a heat insulating clearance therebetween, so that a reaction chamber defined in the inner shell can be maintained at a substantial temperature. It is of course possible to insert a suitable heat-resistant and heat insulating material such as glass fiber into the heat insulating clearance so as to prevent heat from being dissipated from the inner shell of the reactor.

In such a thermal reactor of multiple wall construction, however, problems have been encountered since there is a remarkable difference in thermal expansion between the inner shell and the outer casing. In order to eliminate problems inherent to the difference in thermal expansion, there has already been proposed by Japanese Pat. publication No. 47-1136 to make the inner shell movable with respect to the outer casing. The publication also proposes to provide a double-walled inner shell construction in which exhaust gas passages are defined around an innermost reaction chamber so that engine exhaust gas is introduced with secondary air into the reaction chamber wherein unburnt constituents is oxidized substantially completely and therefrom passed through the exhaust gas passages into the atmosphere.

The above arrangement of Japanese patent publication provides a solution for eliminating the thermal expansion problem between the outer casing and the inner shell, but similar problem still exists in the double-walled inner shell structure. It has been found, further, that the arrangement disclosed in the Japanese patent publication is complicated in structure and also produces a substantial back pressure in the engine exhaust system. Further, the known arrangement is disadvantageous in that it is very difficult to obtain a uniform mixing of the engine exhaust gas with the secondary air in the reaction chamber.

The present invention has an object to provide multiple shell type engine exhaust gas purifying means which is simple in construction and free from any problem caused by difference in thermal expansion between inner and outer shells.

Another object of the present invention is to provide engine exhaust gas purifying means in which engine exhaust gas can be substantially perfectly purified.

A further object of the present invention is to provide engine exhaust gas purifying means which does not cause any remarkable increase in back pressure in the engine exhaust system.

According to the present invention, the above and other objects can be accomplished by engine exhaust gas purifying means comprising inner shell means including at least two shell elements, the first of said shell elements having a closed end and an open end and the second of said shell elements having opposite open ends, said first and second shell elements being disposed with the open end of the first shell element and one of the open ends of the second shell elements opposed with each other with a spacing therebetween, an outer shell enclosing said inner shell means with a gas passage defining spacing therebetween and having outlet port means provided at an end opposite to the second shell element of the inner shell means, first inlet tube means substantially radially passing through the outer shell and opening to said first shell element, and second inlet tube means substantially radially passing through the outer shell and opening to said second shell element, said first and second inlet tube means being secured to the outer shell and respectively to the first and second shell elements.

According to the arrangement of the present invention, a reaction chamber is defined in the inner shell means and unburnt constituents in engine exhaust gas introduced together with secondary air into the inner shell means through the inlet tube means is caused to burn in the reaction chamber. The exhaust gas is then discharged from the opening of the second shell element at the end opposite to the first shell element into the spacing or the gas passage between the inner shell means and the outer shell to be discharged therefrom into atmosphere. Since the inner shell means comprises at least two shell elements which are opposed with each other with a spacing therebetween, a portion of the exhaust gas in the reaction chamber is also allowed to flow through the spacing between the shell elements into the gas passage between the inner shell means and the outer shell to be mixed with stream of hot combustion gas in the passage. Thus, a further combustion of unburnt constituents also takes place in the passage. The arrangement is effective to obtain a substantially perfect purification of the engine exhaust gas. Further, the arrangement is also effective to accommodate difference in thermal expansion between the inner and outer shells due to the existence of the spacing between the inner shell elements.

It is of course possible to provide a third and more open-ended inner shell elements in series alignment with the first and second shell elements to attain the same result. In such an instance each of the additional shell elements may be provided with inlet tube means as in the first and second shell elements.

According to a further aspect of the present invention, the second shell element may be provided with perforations in its wall adjacent to the end opposite to the first shell element.

Thus, a portion of the exhaust gas in the second shell element is allowed to pass through the perforations into the gas flow passage between the outer and inner shells to provide better mixing of the exhaust gas with the secondary air.

Figure 2:
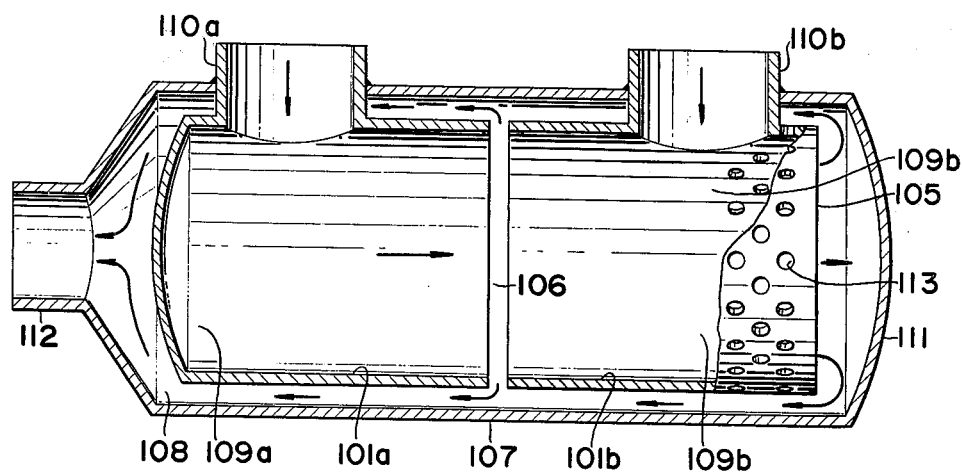

The above and other features of the present invention will become apparent from the following descriptions of preferred embodiments taking reference to the accompanying drawings, in which:

FIG. 1 is a longitudinal sectional view of engine exhaust gas purifying means in accordance with one embodiment of the present invention; and FIG. 2 is a longitudinal sectional view showing another embodiment of the present invention.

Referring to the drawings, particularly to FIG. 1, the engine exhaust gas purifying means illustrated therein comprises inner shell means 1 which includes a first and a second shell elements 1a and 1b both of cylindrical configurations. The first shell element 1a has a closed end and an open end as shown by reference numerals 2 and 3, respectively. The second shell element 1b has opposite open ends as shown by references 4 and 5, respectively. The first and second shell elements 1a and 1b are disposed co-axially with the open ends 3 and 4 opposed with each other with a clearance 6 therebetween. A cylindrical outer shell 7 is disposed so as to encircle the inner shell means 1 with a spacing therebetween. Thus, a gas flow passage 8 of an annular cross-section is defined between the outer shell 7 and the inner shell means 1. Reaction chambers 9a and 9b are defined respectively in the first and second shell elements 1a and 1b. The elements 1a and 1b are also provided with radially extending inlet tubes 10a and 10 b, respectively, which pass through the outer shell 7 and open to the reaction chambers 9a and 9b, respectively. Further, the inlet tubes 10a and 10b are secured to the outer shell 7 and respectively to the first and second shell elements 1a and 1b. The outer shell 7 is closed at an end adjacent to the opening 5 of the second shell element 1b as shown by 11 in FIG. 1 and has an outlet pipe 12 at the other end.

Thus, it will be seen in FIG. 1 that engine exhaust gas is introduced together with secondary air through the inlet tubes 10a and 10b into the reaction chambers 9a and 9b, respectively, and flows axially therethrough as shown by arrows. In the reaction chambers 9a and 9b, substantial part of unburnt noxious constituents in the exhaust gas is oxidized into innoxious constituents under the high temperature retained in the reaction chambers before it flows into the passage 8. According to the arrangement of the present invention, a part of the exhaust gas is allowed to flow into the passage 8 to be mixed with hot gas flow existing in the passage. Further, in this process, better mixing of the exhaust gas and the secondary air can be attained. Thus, a further oxydation takes place in the passage 8 so as to attain substantially perfect purification of the engine exhaust gas. Since the exhaust gas is allowed to pass through the spacing 6 between the first and second shell elements 1a and 1b into the passage 8, there is no possibility that a substantial back pressure is produced in the reaction chambers 9a and 9b.

Engine exhaust gas purifying means constructed in accordance with the embodiment of FIG. 1 and similar means constructed in accordance with the teachings of Japanese Pat. publication No. 47-1136 were tested by the applicants and the results are shown in Table I. The test were made in accordance with 10 mode CVS method and all values are shown in g/km. In the Table, the main jet diameter is the value of the inner diameter of an orifice in the main fuel passage of carburetor.

Table I

| Main Jet Dia. | Noxious constituents | The Invention | Prior Art |
|---|---|---|---|
| 1.06 mm | Carbon Monoxide | 1.08 | 1.62 |
|  | Hydrocarbon | 0 | 0.03 |
| 1.04 mm | Carbon Monoxide | 1.50 | — |
|  | Hydrocarbon | 0 | — |

From the Table, it will be seen that the means in accordance with the present invention is effective to decrease noxious constituents in the engine exhaust gas to a remarkable extent as compared with the known means. In prior art arrangement, it has not been possible to decrease the main jet diameter since the amount of noxious constituents unacceptably increase with decrease in the main jet diameter. According to the present invention, however, the main jet diameter can be decreased with substantially the same level of noxious constituents in the prior art arrangement having large main jet diameter. In operation, the temperature of the inner shell elements 1a and 1b becomes greater than that of the outer shell 7, however, the spacing 6 between the shell elements 1a and 1b absorbs any difference in thermal expansion between the inner and outer shells.

FIG. 2 shows another embodiment of the present invention in which corresponding parts are shown by the same reference numerals with addition of FIG. 100. The embodiment shown therein is identical to the embodiment shown in FIG. 1 except that the second shell element 101b is provided with perforations 113 which may be provided on the area of the element 101b adjacent to the outlet opening 105 thereof. Alternatively, the perforations 113 may be provided at the area of the element 101b adjacent to the first shell element 101a or at the upper half of the second shell element 101b as seen in FIG. 2. In this arrangement, a portion of the engine exhaust gas in the reaction chamber 109b is also allowed to flow through the perforations 113 into the passage 108. This ensures better mixing of engine exhaust gas with secondary air to attain a further improved purification of the exhaust gas.

In both of the embodiment shown in FIGS. 1 and 2, it is of course possible to encircle the outer shell by a suitable heat insulating material or by a further shell to provide a heat insulating clearance therebetween as in conventional arrangements. The heat insulating clearance may be supplied with cooling air when it is desired to do so.

The invention has thus been shown and described with reference to specific embodiments, however, it should be noted that the invention is in no way limited to the details of the illustrated arrangements but changes and modifications may be made without departing from the scope of the appended claims.

I claim:

1. Engine exhaust gas purifying means comprising inner shell means defining reaction chamber means therein, said inner shell means including at least two shell elements, the first of said shell elements having a closed end and an open end and the second of said shell elements having opposite open ends, said first and second shell elements being disposed with the open end of the first shell element and one of the open ends of the second shell elements opposed with each other with a spacing therebetween, an outer shell enclosing said inner shell means with a gas passage defining spacing therebetween and having outlet port means provided at a portion adjacent to the closed end of the first shell element of the inner shell means, first inlet tube means substantially radially passing through the outer shell and opening to said first shell element, and second inlet tube means substantially radially passing through the outer shell and opening to said second shell element, said first and second inlet tube means being secured to the outer shell and respectively to the first and second shell elements.

2. Engine exhaust gas purifying means in accordance with claim 1 in which said second shell element having a wall provided with perforation therein.

3. Engine exhaust gas purifying means in accordance with claim 2 in which said perforations are provided in area of the second shell element adjacent to the end opposite to the first shell element.

4. Engine exhaust gas purifying means in accordance with claim 1 in which said first and second shell elements are cylindrical in configuration and co-axially arranged with each other.

5. Engine exhaust gas purifying means in accordance with claim 4 in which the outer shell is cylindrical in configuration and co-axially disposed with respect to the first and second shell elements.

* * * * *